United States Patent [19]

Seilly

[11] 4,057,744

[45] Nov. 8, 1977

[54] ELECTROMAGNETIC DEVICES

[75] Inventor: Alec Harry Seilly, North Wembley, England

[73] Assignee: Lucas Industries Limited, Birmingham, England

[21] Appl. No.: 754,408

[22] Filed: Dec. 27, 1976

[30] Foreign Application Priority Data

Jan. 22, 1976 United Kingdom ................. 2522/76

[51] Int. Cl.² ............................................. H02K 33/00

[52] U.S. Cl. ......................................... 310/27; 310/30

[58] Field of Search .................. 335/220, 266; 310/13, 310/27, 30

[56] References Cited

U.S. PATENT DOCUMENTS 1,999,795 4/1935 Wright .................................. 310/27

2,917,692 12/1959 Dubsky et al. .................... 310/27 X 4,002,935 1/1977 Braner .................................. 310/27

*Primary Examiner*—Donovan F. Dugga

*Attorney, Agent, or Firm*—Andrus, Sceales, Starke & Sawall

[57] ABSTRACT

An electromagnetic device comprises a pair of a plurality of pairs of helical coils the turns of the coils being alternatively arranged. Each of the coils is formed from a length of tubular magnetizable material and within each coil is an electrical conductor. The conductors in the turns of adjacent coils carry electrical current in opposite directions and the walls of the coils which are adjacent each other are of reduced section so that when the conductors carry electrical current, magnetic flux leakage occurs and the turns of the coils separate thereby producing an extension of the coils which is transmitted to a pair of members.

4 Claims, 1 Drawing Figure

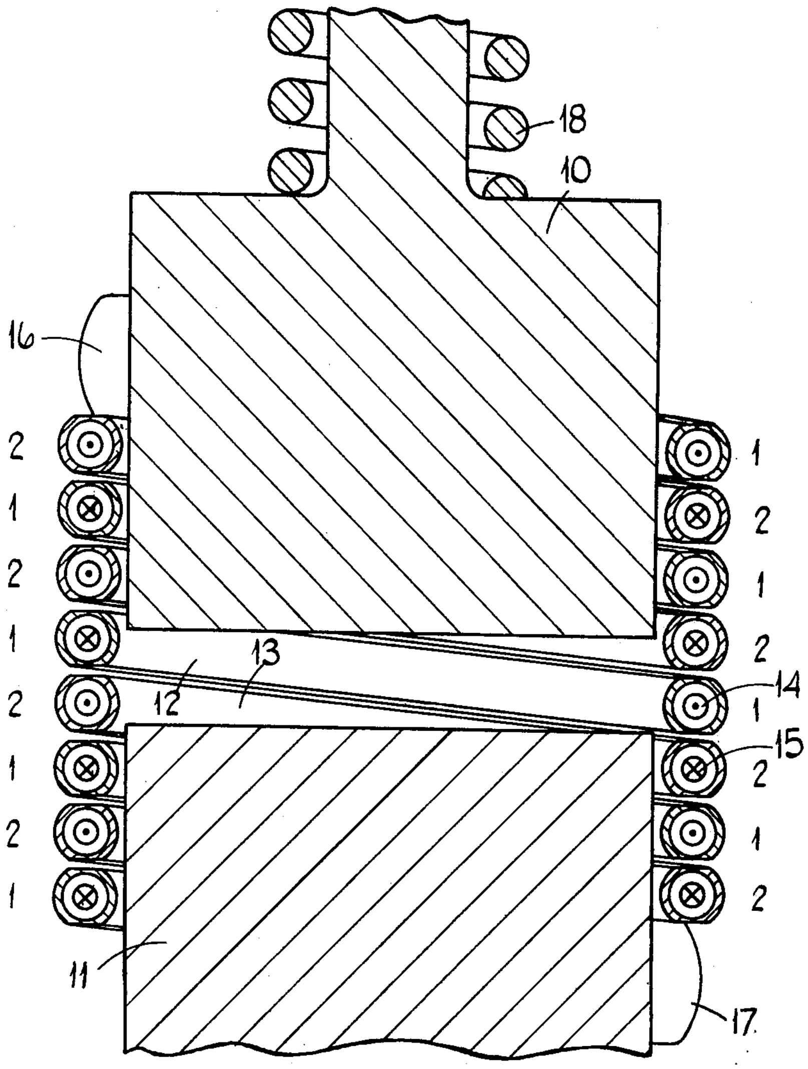
18
10
16
2
1
2
1
2
1
2
1
1
2
1
2
1
2
1
2
13
12
14
15
11
17

ELECTROMAGNETIC DEVICES

This invention relates to electromagnetic devices of the kind including a winding which can be supplied with electric current to achieve relative movement of a pair of numbers forming part of the device.

The object of the invention is to provide such a device in a simple and convenient form.

According to the invention a device of the kind specified comprises a pair or a plurality of pairs of helical coils with the turns of the coils alternately arranged with the turns of the other coil or coils, each of said coils being formed from a length of tubular magnetizable material, the wall of said material being of reduced section over the portions of the coil disposed next to the adjacent coil or coils, said winding comprising conductors disposed within said lengths of material and arranged so that when electric current is supplied to the conductors the current flow in a turn of one coil will be in the opposite direction to the direction of current flow in the adjacent turns of the other coil or coils, the section of said reduced sections being such that flux leakage occurs, said coils being operatively connected to said members whereby the turns of the coils will separate from each other due to the leakage flux to achieve relative movement of the members.

One example of a device in accordance with the invention will now be described with reference to the accompanying drawing which is a sectional side elevation of the device.

The device comprises a pair of members 10, 11 which are of generally cylindrical form and are disposed in spaced end to end relationship. The device also includes a pair of helical coils 12, 13 wound about and extending between the members. The coils are inter-engaged so that the turns of the two coils are alternately arranged. For ease of understanding the turns of the coil 12 are referenced "1" whilst those of the coil 13 are referenced "2".

The two coils are each formed from a length of tubular magnetizable material and the wall of the material is of reduced section over the portions of the coil disposed next to the other coil. The reduced section is obtained either by machining the material prior to coiling or during the manufacture of the material.

Moreover each length of material accommodates an electrical conductor, the conductor within the coil 12 being given the reference numeral 14 and that within the coil 13 being given the reference numeral 15.

The two lengths of conductor are connected together at one end of the interengaged coils so as to form a winding through which electric current can be passed. Moreover the members 10, 11 are provided with abutments 16, 17 respectively which engage the ends of the coils.

When electric current is passed through the winding the direction of current flow in adjacent turns of the two coils is in the opposite direction and due to the reduction in wall thickness, flux leakage occurs. The resulting external magnetic fields interacting to cause separation of adjacent turns and an overall lengthening of the coils takes place so that the members 10, 11 move away from each other. Such movement will be against the natural resilience of the coils although a spring 18 may be provided if required.

The magnitude of the current flow should be such that saturation of the portions of reduced wall thickness takes place and this leads to the maximum flux leakage. The natural position of the coils can be such that adjacent turns are spaced or in contact with each other.

It will be understood that further coils may be utilized with the turns alternately arranged. The only requirement is that the current flow in the conductor in adjacent turns should be in the opposite direction and therefore the further coils must be added in pairs. Moreover, it will be appreciated that the conductors in the coils may be connected in parallel. It is essential however to ensure that the current flow in adjacent turns of the coils is in the opposite direction.

The conductors can be connected separately to the source of supply and in this case one conduction may be permanently connected to the supply. In such a case the coils will be closed together with the one conductor energised but will separate as described when both conductors are energised.

I claim:

1. An electromagnetic device including a winding through which electric current can be passed, a pair of relatively movable members, a pair or a plurality of pairs of helical coils with the turns of the coils alternately arranged with the turns of the other coil or coils, each of said coils being formed from a length of tubular magnetizable material, the wall of said material being of reduced section over the portions of the coil disposed next to the adjacent coil or coils, said winding comprising conductors disposed within said lengths of material and arranged so that when electric current is supplied to the conductors the current flow in a turn of one coil will be in the opposite direction to the direction of current flow in the adjacent turns of the other coil or coils, the section of said reduced sections being such that flux leakage occurs, said coils being operatively connected to said members whereby the turns of the coils will separate from each other due to the leakage flux to achieve relative movement of the members.

2. An electromagnetic device according to claim 1 in which said conductors are connected in series.

3. An electromagnetic device according to claim 1 in which said conductors are connected in parallel.

4. An electromagnetic device according to claim 1 including resilient means acting on one of said members to oppose the relative movement of the members.

* * * * *